United States Patent [19]
Mathes

[11] Patent Number: 5,302,046
[45] Date of Patent: Apr. 12, 1994

[54] CLAMPING MECHANISM FOR FRICTIONALLY ENGAGING AND SECURING TOGETHER GEAR DRIVE COMPONENTS

[75] Inventor: Josef Mathes, Offenbach am Main, Fed. Rep. of Germany

[73] Assignee: Man Roland Druckmaschinen AG, Fed. Rep. of Germany

[21] Appl. No.: 992,583

[22] Filed: Dec. 18, 1992

[30] Foreign Application Priority Data

Dec. 18, 1991 [DE] Fed. Rep. of Germany ....... 4141818

[51] Int. Cl.$^5$ .............................................. F16B 1/00
[52] U.S. Cl. ................... 403/370; 403/367; 403/368
[58] Field of Search ............... 403/373, 374, 371, 370, 403/367, 368, 365, 372, 314, 277, 278, 279, 282

[56] References Cited

U.S. PATENT DOCUMENTS

| | | |
|---|---|---|
| 2,326,866 | 8/1943 | Kincaid . |
| 2,460,510 | 2/1949 | Laesser . |
| 4,025,214 | 5/1977 | Spieth .................................. 403/370 |
| 4,589,797 | 5/1986 | Martins ................................ 403/372 |

FOREIGN PATENT DOCUMENTS

| | | |
|---|---|---|
| 3834429 | 12/1989 | Fed. Rep. of Germany . |
| 3820026 | 8/1991 | Fed. Rep. of Germany . |
| 1481520 | 5/1989 | U.S.S.R. ............................... 403/282 |

Primary Examiner—Randolph A. Reese
Assistant Examiner—Anthony Knight
Attorney, Agent, or Firm—Leydig, Voit & Mayer, Ltd.

[57] ABSTRACT

A clamping mechanism for frictionally securing together two radially adjacent concentric components of a gear drive wherein an annular clamping disc having concentric inner and outer peripheral edges and a substantially conically shaped convex portion between the edges is partially disposed in an annular recess in one of the gear drive components. Force applying means, such as tensioning bolts, cooperate with circumferentially spaced apertures in the convex portion of the clamping disc and threaded bores in the component to urge the peripheral edges of the clamping disc into frictional engagement with wall portions of the annular recess and with a concentric surface of the radially adjacent gear drive component.

5 Claims, 4 Drawing Sheets

CLAMPING MECHANISM FOR FRICTIONALLY ENGAGING AND SECURING TOGETHER GEAR DRIVE COMPONENTS

FIELD OF THE INVENTION

The present invention relates generally to clamping mechanisms and more particularly concerns a clamping mechanism for frictionally engaging and securing together the components of a gear drive such as a gear ring, a gearwheel and a shaft.

BACKGROUND OF THE INVENTION

A problem frequently recurring in engineering is to releasably interconnect rotationally symmetrical parts. Clamping connections are frequently used for this purpose based on frictional transmission of forces. In such cases, spring forces, fluid pressure devices, or simple screw connections, apply a clamping force which, by acting on friction surfaces, ensures that the two parts are connected so as to rotate with one another. Very high forces are necessary in some cases to maintain the connection and secure the relative position of the two parts. Consequently, ordinary clamping elements are unsuitable or else the requirements that the clamping elements must satisfy are of such high specification that in some cases uneconomical connecting elements have to be used.

In printing engineering it is known, for example, to dispose double gearwheels in the transmission line of sheet-fed rotary presses so that sub-units of the press can be displaced relative to one another. In a double gearwheel of this kind, a gearwheel ring is fitted on a main gearwheel and is clamped fast there by means of clamping elements. The latter must ensure that the relative position between the gearwheel ring and the main gearwheel is maintained even under maximum stress. In some cases the clamping connection is in the form of a simple pressure connection, the friction surfaces between the gearwheel ring and the main gearwheel being used for the force transmission. Typically, the peripheral forces are applied by normal forces of appropriate value. For this purpose, strong springs and a corresponding number of clamping screws are required.

One approach to such an arrangement is described in DE-A1 38 20 026. As shown in this references, the gear ring is coupled to the main gearwheel via a connection in the form of a disc clutch in order to provide a non-positive connection between a fixed gearwheel and a movable gearwheel on a cylinder of a turn-over mechanism in a sheet-fed rotary press. The clutch discs are mounted at the end face of the main gearwheel and clutch discs are also provided concentrically thereof on the gearwheel ring and engage in the spaces between the clutch discs on the main gearwheel. In the region of the overlap, a clamp ring is fitted on the clutch discs and can be clamped relative to the main gearwheel. As a result, the clutch discs are clamped together and the gearwheel ring is frictionally connected to the main gearwheel.

Unfortunately, the entire arrangement of the foregoing reference makes the construction of the double gearwheel relatively complex. Also, there is no safeguard that the frictional forces will be uniformly distributed over the entire periphery. In addition, the construction is expensive due to the large number of parts.

A mechanism for deforming a gearwheel is known from DE-C1 3834429. This reference describes a gearwheel whose hub can be deformed by tensioning elements in order to change the diameter. However, it is not possible to secure the gearwheel with this mechanism.

It is the primary aim of the present invention to provide a clamping mechanism which enables a reliable and secure frictional connection to be achieved between relatively rotatable components of a gear drive.

A related and important object is to provide such a frictional clamping mechanism which achieves a secure connection in a relatively simple manner with greatly reduced forces.

It is also an object of the invention to provide a frictional clamping mechanism that employs only a few parts that may be made relatively economically.

In accordance with the present invention, a clamping mechanism is provided for securing together two radially adjacent concentric components of a gear drive, such components including, for example, a toothed gear ring, a gearwheel, a hub and a shaft. An annular recess is formed in the gear drive component and defines at least one circumferential and one radial wall. A substantially conically shaped convex clamping disc having a plurality of circumferentially spaced apertures is disposed in the annular recess. A plurality of tensioning bolts cooperate with the apertures in the clamping disc and threaded bores in the annular recess to compress the clamping disc and urge its peripheral edges radially into frictional engagement with the concentric gear drive components and axially into frictional engagement with the radial wall of the annular recess.

A particularly advantageous feature of the clamping mechanism of the present invention is that there is not just one friction surface in the axial direction, but also at least one other one directed radially to the gearwheel. Depending on the specific arrangement, two radially directed friction surfaces may be provided, thus enabling the transmissible torques to be additionally increased. Furthermore, the release forces required for tensioning elements of this kind are reduced in comparison with purely screw or spring connections. The conical arrangement of the tensioning element results in differences in clamping forces at the periphery of the gearwheel being substantially uniform. Assembly and removal of the gearwheels or gearwheel rings are also greatly simplified. The mechanism can be used with a direct or indirect action. In addition, the radial tensioning surfaces may optionally be used separately or else the radial and axial tensioning surfaces can be used jointly. Finally, in combination with the tensioning effect, it is also possible to deform the gearwheel ring to correct production errors.

These and other features and advantages of the invention will be more readily apparent upon reading the following description of the preferred embodiments of the invention and upon reference to the accompanying drawings.

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENT

Figure 1:
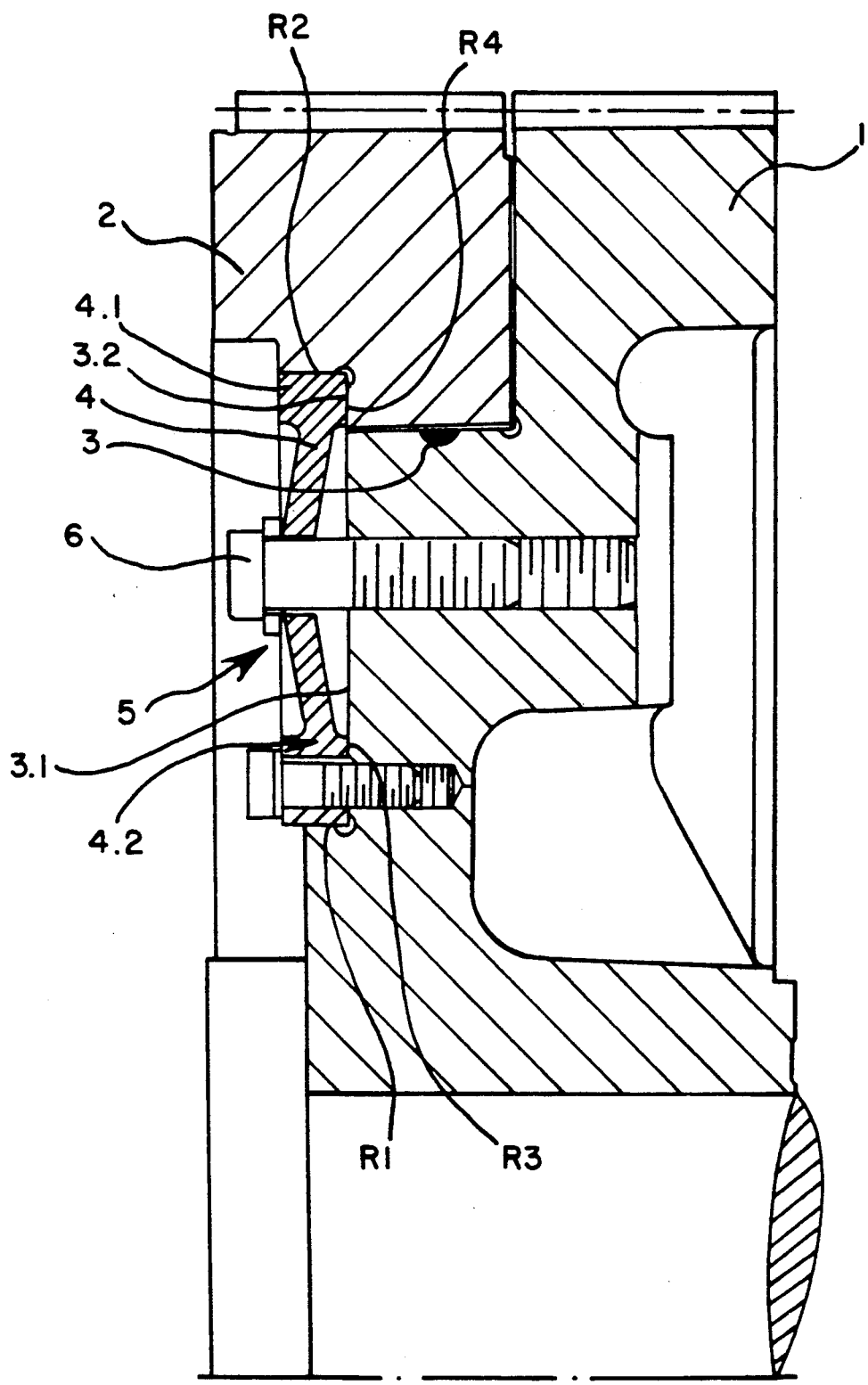
FIG. 1 is a fragmentary axial section through a double gearwheel of a sheet-fed printing press drive.

Turning now to the drawings, FIG. 1 shows how a main gearwheel .1I in the drive of a sheet-fed printing press can have connected to it a gearwheel ring 2 to form a double gearwheel. In this embodiment, the inner periphery of the gearwheel ring 2 is mounted on a collar 3 of the main gearwheel 1. In accordance with the invention, the gearwheel ring 2 is clamped to the main gearwheel 1 by friction forces applied by a tensioning element in the form of a clamping disc 4. The clamping disc 4 is in the form of a conical annular disc having an outwardly convex shape with an annular rise 5 at the center, the inner and outer peripheral edges of the annular disc being in the form of rings 4.1 and 4.2. As shown here, the clamping disc 4 is disposed coaxially to the main gearwheel 1 in an annular recess 3.1 having an inner circumferential wall and an outwardly extending radial wall. The outer periphery of the clamping disc is disposed in an annular groove 3.2 having radial and circumferentially oriented walls in the gear ring 2. The clamping disc 4 has a friction surface R1 at its inner periphery, another friction surface R2 at its outer periphery and additional friction surfaces R3 and R4 at one end face.

In the illustrated embodiment, tensioning bolts or screws 6 engage the tensioning element 4 in the area of the annular rise 5 of the cone. The tensioning bolts or screws 6 pass through circumferentially spaced apertures in the annular disc 4 and are screwed into internally threaded axial bores disposed in circumferentially spaced relation in the main gearwheel 1. The tensioning force is thus adjusted by way of the prestressing of the tensioning screws 6. As a result, the clamping disc 4 is pressed apart at the annular rise 5 so that it is urged radially in the inward or outward direction and in so doing is pressed tightly with its inner peripheral edges at R1 and R3 frictionally engaging, respectively, against the circumferential and radial walls of the annular recess 3.1 of the main gearwheel 1, and the outer peripheral edges at R2 and R4 frictionally engaging, respectively, against the circumferential and radial walls of the annular groove 3.2 of the gear ring 2. In these conditions the tensioning element or clamping ring 4 is wedged by the peripheral edge rings 4.1 and 4.2 in the tensioning surfaces on the main gearwheel 1 and the gearwheel ring 2. In the case of manual tensioning, the tensioning screws 6 have to be retensioned as necessary or, to release the gearwheel ring 2, have to be released. In each case the clamping disc 4 is subject to deformation with a corresponding increase or reduction in the diameter of the clamping disc.

It will be appreciated, of course, that the foregoing arrangement is also suitable for automatic tensioning. A release force can be exerted on the tensioning screws in the main gearwheel by way of an auxiliary element. A spring assembly, for example, may be provided for each tensioning screw in order to generate a counteracting force. The clamping force of the spring assembly on the tensioning element may be reduced for releasing the coupling and the tensioning element is relieved of tension. Under these conditions, the frictional connections at the outer ring of the tensioning element are also relieved and the gearwheel ring can be turned relative to the main gearwheel. Such a spring assembly arrangement is also advantageous in order to achieve a peripherally more uniform action of the tensioning element. This type of an arrangement also contributes towards keeping the actuating forces low and is particularly important for automated releasing operation.

A clamping connection of the foregoing kind can also be employed for fixing gearwheels on a cylinder journal or shaft. In that case, tensioning elements can be provided on both sides of the gearwheel. Any inaccuracies in the manufacture of gearwheels can be obviated by an arrangement using a corresponding plurality of tensioning screws at the periphery.

Figure 2:
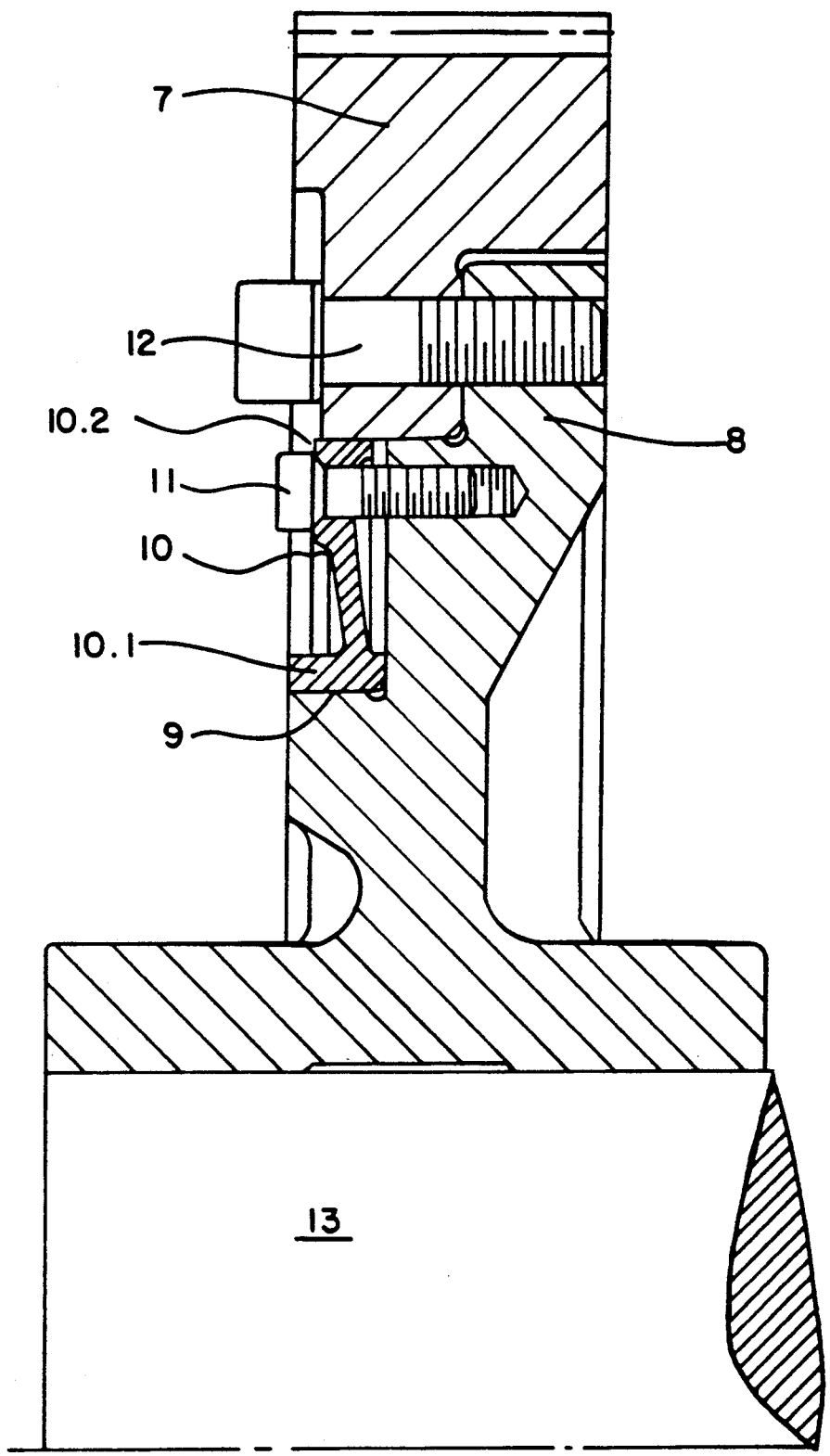
FIG. 2 is a similar axial section through a gearwheel with a gearwheel ring fitted radially thereon.

Turning now to an alternative embodiment of FIG. 2, a gearwheel ring 7 is fixed on a gearwheel flange 8 mounted on a shaft 13. Between the flange 8 and the gearwheel ring 7 a tensioning element 10 is provided laterally on a collar 9 coaxially to the gearwheel. As shown here the tensioning element 10 consists of just a ring 10.1 in the form of an inclined annular disc. Tensioning screws 11 anchored in circumferentially spaced bores in the flange 8 engage in the raised outer periphery 10.2. Peripheral securement is provided by retaining screws 12.

In accordance with this embodiment of the invention, the tensioning element 10 serves to secure the gearwheel ring 7 relative to the shaft 13. When the tensioning screws 11 are adjusted, the tensioning element 10 presses by its outer periphery 10.2 to a varying degree against the inner periphery of the gearwheel ring 7 and bears by the ring 10.1 internally and at the end face against the collar 9. To improve the adjustment, the outer periphery 10.2 can be formed as an axially convex annular surface. Alternatively, it is also possible to achieve simultaneous clamping and tensioning, if the tensioning element 10 is constructed, as in FIG. 1 as a two-sided annular disc and is arranged to engage in a corresponding annular recess on the gearwheel ring 7.

Figure 3:
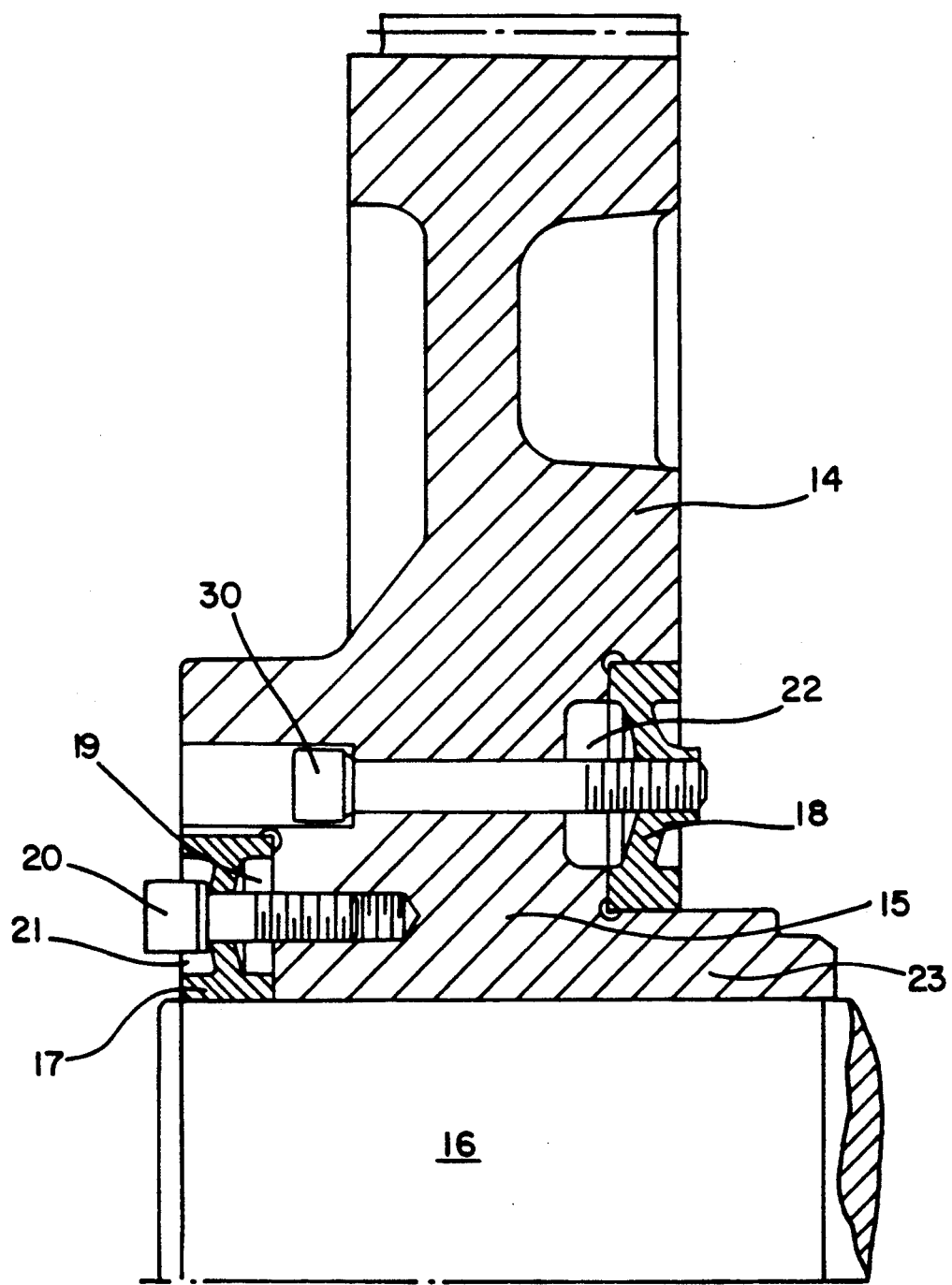
FIG. 3 is a fragmentary axial section through a gearwheel fixed to a shaft according to the invention; and, FIG. 4 is a plan view of a tensioning element of the type illustrated in FIGS. 1 and 3.

Pursuant to further embodiments of the invention, FIG. 3 shows two variants for securing a gearwheel on a shaft. As shown here, the gearwheel 14 is mounted by its hub 15 on a shaft 16. Two tensioning elements 17 and 18 are provided in the area of the hub 15 to clamp the gearwheel 14 on the shaft 16 and coaxially to the shaft. One tensioning element 17 is mounted in a recess 19 at the edge of the shaft bore in the gearwheel 14. It is formed as a conical annular disc having at each periphery a generally rectangularly shaped edge ring. Tensioning screws 20 are disposed in the region of the annular rise 21 of the annular disc and are threadedly anchored in the hub 15. The other tensioning element 18 shown in FIG. 3 is mounted in an annular recess 22 between the hub 15 and the body of the gearwheel 14. The hub terminates in a wide axially extending and relatively easily deformable foot 23. The tensioning element 18 is held by tensioning screws 30. Thus when the tensioning screws 20 and 30 are tightened, the gearwheel 14 is either directly or indirectly clamped on the shaft 16 via the foot 23 by means of the tensioning elements 17 and 18 as a result of elastic deformation.

Figure 4:
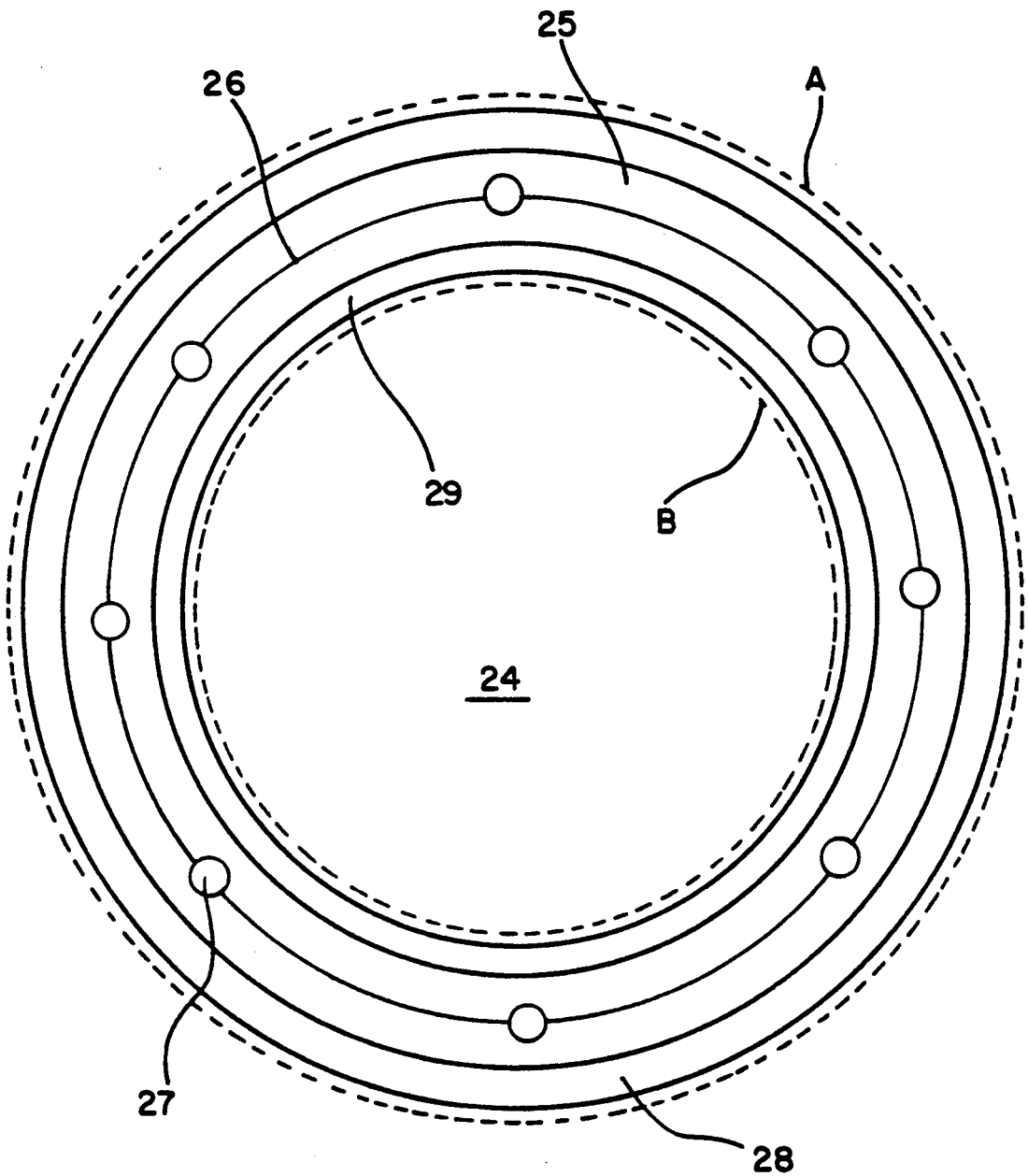

Turning now to FIG. 4, a plan view of a tensioning element 24 is shown which may correspond to the tensioning elements 4, 17 and 18 in the exemplified embodiments described above in connection with FIGS. 1 and 3. It consists of a conical annular disc 25 terminating in an annular rise 26. In cross-section, therefore, it is generally outwardly convex somewhat in the shape of a roof, as shown in FIGS. 1 and 3. Circumferentially spaced apertures 27 are disposed in the region of the rise 26 and the annular disc 25 is bounded by outer and inner peripheral rings 28 and 29, respectively, of substantially rectangular cross-section. The tensioning element 24 is subjected to elastic deformation in the direction of the broken lines A and B by tensioning with tensioning screws (not shown here) in the apertures 27. It will also be understood that to facilitate deformation, either the outer ring 28 and/or the inner ring 29 of the tensioning element 24 may optionally be provided with radial slots.

I claim as my invention:

1. A clamping mechanism for frictionally securing together two radially adjacent concentric components of a gear drive including as components a toothed gear ring, a gearwheel, a hub and a shaft having an axis, comprising in combination, an annular recess formed in one of said gear drive components concentric with said shaft axis, said recess defining at least one circumferential wall extending substantially concentric to said shaft axis and one radial wall extending substantially perpendicular to said shaft axis, said radial wall having a plurality of circumferentially spaced axially disposed bores formed therein, one of said radially adjacent gear drive components defining a concentric cylindrical surface disposed in oppositely facing relation to said circumferential wall, an annular clamping disc partially disposed in said annular recess, said disc having concentric inner and outer peripheral edges with an outwardly substantially conically shaped convex portion having a substantially smooth outer surface between said peripheral edges and a plurality of circumferentially spaced apertures formed in said convex portion, each of said concentric inner and outer peripheral edges of said disc being uniformly circular and disposed substantially in a single plane perpendicular to said axis, and force applying means cooperating with said circumferentially spaced apertures and bore for compressing said disc so as to urge one of said peripheral edges thereof substantially uniformly radially into frictional engagement with said circumferential wall and substantially uniformly axially into frictional engagement with said radial wall and to urge said other peripheral edge thereof substantially uniformly radially into frictional engagement with said concentric cylindrical surface of said radially adjacent gear drive component.

2. A clamping mechanism as defined in claim 1 wherein said gearwheel is formed with a concentric collar thereon and said gear ring is formed with an inner peripheral portion rotatably mounted on said collar, said annular recess is formed in said gearwheel adjacent to and radially inward of said collar, said gear ring is formed with a stepped annular groove adjacent to and radially outward of said inner peripheral portion, said disc is mounted in said annular recess, and said force applying means urges said inner peripheral edge of said disc substantially uniformly radially inwardly into frictional engagement with said circumferential wall and substantially uniformly axially into frictional engagement with said radial wall of said recess and urges said outer peripheral edge of said disc substantially uniformly radially outwardly and axially into frictional engagement with said stepped annular groove.

3. A clamping mechanism as defined in claim 1 wherein at least one peripheral edge of said disc is formed with peripheral ring having a generally rectangular shape in axial cross-section and has an axial dimension greater than the axial thickness of said convex portion.

4. A clamping mechanism as defined in claim 1 wherein said annular recess is formed in said gearwheel hub portion adjacent to and radially outward of said shaft, said clamping disc is disposed in said annular recess, and said force applying means urges said outer peripheral edge of said disc substantially uniformly radially outwardly and axially into frictional engagement with said circumferential and radial walls of said recess, respectively, and urges said inner peripheral edge of said disc substantially uniformly radially inwardly into frictional engagement with said shaft.

5. A clamping mechanism as defined in claim 1 wherein said gearwheel is formed with an axially projecting deformable foot portion adjacent said hub, said annular recess is formed in said gearwheel adjacent to and radially outward of said deformable foot portion, and said force applying means urges said outer peripheral edge of said disc substantially uniformly radially outwardly and axially into frictional engagement with said circumferential and radial walls of said recess, respectively, and urges said inner peripheral edge of said disc substantially uniformly radially inwardly to force said deformable foot portion into frictional engagement with said shaft.

* * * * *